United States Patent [19]

Rossi

[11] 4,125,629

[45] Nov. 14, 1978

[54] PROCESS FOR IMPROVING GROWTH RATE OF PIGLETS DURING WEANING

[75] Inventor: Jean E. Rossi, Petit-Lancy, Switzerland

[73] Assignee: Firmenich SA, Geneva, Switzerland

[21] Appl. No.: 786,883

[22] Filed: Apr. 12, 1977

Related U.S. Application Data

[63] Continuation-in-part of Ser. No. 690,868, May 28, 1976, abandoned.

[51] Int. Cl.² ............................................... A23K 1/18
[52] U.S. Cl. ........................................ 426/2; 426/534
[58] Field of Search ................... 426/2, 534, 538, 656, 426/658, 807

[56] References Cited

PUBLICATIONS

Morrison, "Feeds and Feeding", Morrison Publishing Co., 1956, pp. 1123–1124.
Fenorolis, "Handbook of Flavor Ingredients", Chemical Rubber Co., 1971, pp. 733–735.

*Primary Examiner*—R. B. Penland
*Attorney, Agent, or Firm*—Pennie & Edmonds

[57] ABSTRACT

A process is disclosed to be useful in reducing the anorexia induced by the weaning of piglets and in improving their growth rate in early life.

2 Claims, No Drawings

PROCESS FOR IMPROVING GROWTH RATE OF PIGLETS DURING WEANING

CROSS-REFERENCES

This is a continuation-in-part application of application Ser. No. 690,868, filed May 28, 1976, now abandoned.

BACKGROUND OF THE INVENTION

Animals, like man, have preferences for certain feedstuffs. These are either of internal origin, i.e., genetic, or of external origin, i.e., derived from habits acquired during their life cycle.

Improved palatability of animal feedstuffs will therefore play an important role in the profitability of animal husbandry.

The choice and acceptance of the feedstuff proposed to the young animal will depend firstly on the habits already acquired during its early life cycle. Thus, it will begin by going towards the place where it is used to finding its feedstuff and will tend to eat in a normal manner only if the feedstuff is identical to that to which it is already accustomed. If the nature and appearance of the feed has changed, the animal will be disorientated and, depending upon the importance of the change, will either refuse the feed completely, or upset the trough and destroy the feedstuff. All the senses of the animal are affected by this natural and instinctive reaction but, in particular, it is a combination of smell and taste which determines whether the animal will continue regular feeding.

It is known that even a few days of lowered consumption or poor assimilation can lead to a reduction in the animal's growth rate. Thus, changes in the type of feedstuff, such as those which occur during the weaning period, provoke disturbances which tend to reduce the regular feed intake and, consequently, the growth of the animals.

The most difficult period in the life of a pig is indisputably whilst it is being weaned.

During this period, the piglet is taken away from its mother and incorporated into a group of animals with which it is unfamiliar. Simultaneously, its food changes and the piglet's organism must get used to digesting something other than the sow's milk.

Effectively, the animal becomes disorientated and this leads to reduced growth for some weeks.

Pig breeders endeavour to lessen the negative effects of weaning by trying to accustom piglets to their new type of food whilst they are still with the sow. This is not easy: as long as the natural milk meets its needs, the piglet is not interested in eating anything else.

A great deal of effort has been devoted to the improvement of the feedstuff. For instance, the appetizing effects achieved by the addition of sugar, skimmed milk and rolled oats, as well as of some of the aromatic components found in the sow's milk, have been largely proved [cf. Talmadge B. Tribble, "Feed Flavor and Animal Nutrition," 1st Ed., Agriaids, Inc. (1962)].

However, it has been noticed that piglets not only ate the food they liked, but also played with it and thus wasted it.

Moreover, although successful liquid sow milk substitutes have been developed, they are not accepted by the farm operators due to the fact that they must be prepared daily and fed at constant temperature. Another disadvantge is that all feeding equipment must be thoroughly cleaned and extreme sanitation maintained.

THE INVENTION

Following our observations on the conditioning of baby pigs, we discovered that it was possible to avoid the above-mentioned inconveniences by way of a process which comprises feeding, for a period of at least 1 week before parturition, a pregnant sow and subsequently, for the lactation period, a lactating sow with a feedstuff aromatized by means of a flavoring composition comprising
 a. 30 to 50% by weight of aldehydes;
 b. 25 to 35% by weight of alcohols;
 c. 3 to 7% by weight of esters, and
 d. 20 to 30% by weight of terpenes derivatives,
and then placing at the disposal of the piglets born by the said sow a solid feedstuff aromatized by means of the same type of flavoring composition.

We observed that by the said process the weaning period of the baby pigs was reduced.

A further object of the present invention relates to a process for increasing the growth of piglets during weaning which comprises feeding, for a period of at least 1 week before parturition, a pregnant sow and subsequently, for the lactation period, a lactating sow with a feedstuff aromatized by means of a flavoring composition comprising
 a. 30 to 50% by weight of aldehydes;
 b. 25 to 35% by weight of alcohols;
 c. 3 to 7% by weight of esters, and
 d. 20 to 30% by weight of terpenes derivatives,
and then placing at the disposal of the piglets born by the said sow a solid feedstuff aromatized by means of the same type of flavoring composition.

A further object of the present invention relates to a process for increasing the growth rate of piglets during weaning which comprises feeding a pregnant, and subsequently lactating, sow with a feedstuff aromatized by means of a flavoring composition and then placing at the disposal of the piglets born to the said sow a feedstuff aromatized by means of the same type of flavoring composition.

PREFERRED EMBODIMENTS OF THE INVENTION

The incorporation of the flavoring composition into the feedstuff destined for the pregnant sow does not need to be effected during the whole pregnancy cycle. Suitably, such an incorporation can be effected during a few days at least, preferably 1 week, before parturition and should be continued during lactation. Although the time during which the pregnant, and subsequently lactating, sow is fed with flavored food is not critical, for reasons of economy it is preferred not to extend it unduly. The fact is that in principle one has to avoid rendering the pregnant sow's feed too appetizing, excessive weight increase at this stage having to be avoided. It is precisely for this reason that a normal pregnant sow's diet does not comprise any additional flavoring ingredient, its diet comprising exclusively feedstuff having a high protein content.

It has also been demonstrated that it is best to provide a low-energy feed during the lactation period. It is generally recommended that the sow be allowed to gain no more than 100 lbs. for a 5-week lactation period.

The nature of the flavoring composition which is added to the sow's and the piglets' feed can vary. Commonly used and commercially available feedstuff flavor compositions can be conveniently employed [cf. e.g. Feed Formulations, "Flavors in Feed," Feed Trade Manual (1960)].

In order to facilitate their incorporation into the animal feed, the flavor compositions are preferably fixed on a powdered solid carrier (Premix-type mixtures, for example), such an operation having the advantage of conferring to the composition a remarkable stability towards the common ingredients present in swine feeds, such as, for instance, corn, soy bean oil meal, sucrose, dried skimmed milk, dried whey, etc.

The concentration at which the flavor compositions are added to the sow's and piglets' feed can vary within wide limits. The concentration is as usual determined by suitable palatability, consequently it depends on the nature of the chosen feed and on the flavoring power of the composition used. We observed that concentrations of the order of about 0.001 to about 0.1% may conveniently be used in accordance with the processes of the invention.

By the processes of the invention the animal would not fail to recognize in the food placed at its disposal the ingredients which had been incorporated in the sow's milk and would automatically like the food and eat it. Greediness and waste were also avoided.

The present invention is better illustrated by, but not limited to, the following examples.

EXAMPLE 1

The trial was carried out on a large experimental farm in the United States of America. Half of the pregnant sows were given flavored food, the other half had the same food but unflavored. In the same way, half of the piglets born to the said sows in each group were given the flavored food, and the other half the "reference" food, e.g., unflavored, from the 15th day.

The feedstuff consisted of commonly used mixtures rich in maize. For this piglets, a special feed for weaning at 5 weeks was used.

The average results are indicated in the following table:

Table 1

| Flavour | | Number of piglets | Average birth weight (kg) | Average 2-week weight (kg) | Weaning age (days) | Average weaning weight (kg) | Consumption average piglets (kg) |
|---|---|---|---|---|---|---|---|
| Sow | Piglets | | | | | | |
| — | + | 56 | 1.52 | 3.75 | 34.4 | 8.43 | 1.30 |
| + | + | 54 | 1.47 | 3.87 | 35.0 | 8.75 | 1.12 |
| — | — | 75 | 1.46 | 3.83 | 35.0 | 8.61 | 0.98 |
| + | — | 48 | 1.39 | 3.47 | 35.0 | 7.98 | 0.84 |

First of all we can see that the different types of feed did not give very different results in the average weights between birth and 2 weeks. The differences in weight gains appear during the period from 2 weeks to weaning time.

If we compare lines 1 (usual feeding technique) and 3 (unflavored food), we see that the average food consumption per animal increased when the food is flavored. This proves that the piglets liked the flavoring, but we did not find at weaning time the increase in weight which should correspond to the higher food consumption. We might think there was some waste, or that the consumption was too high for the animal to assimilate fully what it ingested.

If we compare line 2 (the whole food being flavored, the piglets theoretically having been conditioned by the existence of the flavor in the sow's milk) and line 3 (unflavored food), it appears that piglets which ate flavored food (and the mothers of which also had flavored food), ate more than the others. But here, increased food consumption resulted in a higher weight gain corresponding to the additional food ingested.

If we now compare lines 3 (unflavored food) and 4 (flavored food for sows only), we see that those piglets who had unflavored food, but the mothers of which had flavored food, ate less than those which had unflavored food and the mother of which also had unflavored food. This confirms the theory of animal conditioning by means of the flavoring via the mother's milk: when they no longer find the odor and taste they are used to, they are disorientated.

EXAMPLE 2

The aim of the trial was to confirm the results we obtained previously and to prove that the distribution of flavored feed to milk-sows conditioned the piglets and was therefore more advantageous than the traditional method of giving flavored food to piglets only.

The trail was carried out on a large-scale pig-farm near Pavia (Italy) under field conditions.

The specific conditions under which the trail took place, were as follows:

the experimental animals were separated into 2 groups: in one group, the sow and the piglets were given flavored food, and in the other, only the piglets were given a commercial flavor.

the flavor, in liquid form, was added to the food at a level of 50 ppm.

for practical reasons, the sows were given flavored food only after farrowing.

the food, in pellets, was given to the piglets about 1 week after birth.

the animals were weighed at birth, then weaned and weighed at the age of 3 weeks; their food consumption and weights were checked 2 weeks afterwards.

the death rate was controlled both at birth and at weaning.

the food for the piglets was made from fishmeal, soya, skimmed-milk and cereals in the form of flakes, as well as the usual additions of vitamins and minerals.

The food composition was as follows:

| Wende's analysis | | Other values | |
|---|---|---|---|
| crude protein | 19.0% | Digestible energy: | 3250 Kcal/kg |
| crude fat | 5.0% | Ewers' starch | 38.0 % |
| crude fibre | 2.5% | lysin | 0.93% |
| ash | 5.0% | methionin + cystin | 0.78% |
| moisture | 12.0% | tryptophan | 0.23% |
| nitrogen free extract | 56.5% | calcium | 0.80% |
| | | phosphorus | 0.77% |
| | 100.0% | | |

RESULTS

The average figures of piglets alive at birth and living at the weaning time are shown in the following table 2:

Table 2

| flavour | total born | alive at birth | still-born | deaths | living at weaning |
|---|---|---|---|---|---|
| + | 11.56 | 11.04 | 0.52 | 1.76 | 9.28 |
| − | 11.36 | 10.68 | 0.68 | 1.47 | 9.21 |

As could be expected, the presence of a flavor in the food of both the lactating sows and the piglets did not cause any significant changes in the number of piglets born and weaned.

In vivo results: These are shown by the following tables:

Table 3

LITTERS RECEIVING FLAVOUR IN SOWS' AND CREEP FEED

Average values for groups of 10 sows farrowing at the same time - 60 sows in total

| average weights (kg) | | | number of days | | | average daily gain (g) | | | feed intake g/day (from weaning) | feed to gain ratio |
|---|---|---|---|---|---|---|---|---|---|---|
| birth | weaning | final | weaning | final | total | up to weaning | from weaning | birth to final weight | | |
| 1.169 | 4.722 | 5.250 | 21.88 | 14.40 | 36.28 | 162.4 | 36.6 | 112.5 | 91.6 | 2.50 |
| 1.178 | 4.733 | 5.943 | 20.78 | 15.81 | 36.59 | 171.1 | 76.5 | 130.2 | 141.6 | 1.85 |
| 1.263 | 5.714 | 8.000 | 29.55 | 14.74 | 44.29 | 150.6 | 155.1 | 152.1 | 290.7 | 1.88 |
| 1.288 | 6.615 | 9.231 | 29.20 | 15.00 | 44.20 | 182.4 | 174.4 | 179.7 | 317.9 | 1.82 |
| 1.261 | 5.735 | 7.603 | 26.36 | 15.44 | 41.80 | 169.7 | 121.0 | 151.7 | 190.5 | 1.57 |
| 1.354 | 5.518 | 8.106 | 27.49 | 15.88 | 43.37 | 151.4 | 162.2 | 155.3 | 224.2 | 1.38 |
| | | | | | averages | | | | | |
| 1.246 | 5.453 | 7.204 | 25.54 | 15.25 | 40.79 | 164.7 | 114.8 | 146.1 | 204.7 | 1.78 |

Table 4

LITTERS RECEIVING FLAVOUR ONLY IN CREEP FEED

Average values for groups of 9 - 10 sows farrowing at the same time - 59 sows in total

| average weights (kg) | | | number of days | | | average daily gain (g) | | | feed intake g/day (from weaning) | feed to gain ratio |
|---|---|---|---|---|---|---|---|---|---|---|
| birth | weaning | final | weaning | final | total | up to weaning | from weaning | birth to final weight | | |
| 1.195 | 4.215 | 4.662 | 17.32 | 14.80 | 32.12 | 174.4 | 30.2 | 107.9 | 78.0 | 2.59 |
| 1.171 | 6.062 | 7.585 | 26.54 | 15.00 | 41.64 | 183.6 | 101.5 | 154.0 | 225.6 | 2.22 |
| 1.267 | 5.812 | 8.634 | 29.76 | 14.92 | 44.68 | 152.7 | 189.1 | 164.8 | 328.5 | 1.74 |
| 1.326 | 4.851 | 6.149 | 24.96 | 14.54 | 39.50 | 141.2 | 89.2 | 122.1 | 246.3 | 2.76 |
| 1.336 | 5.102 | 6.235 | 21.26 | 14.91 | 36.17 | 177.1 | 76.0 | 135.4 | 177.5 | 2.34 |
| 1.219 | 5.563 | 7.620 | 30.57 | 14.65 | 45.22 | 142.1 | 140.4 | 141.6 | 254.8 | 1.82 |
| | | | | | averages | | | | | |
| 1.249 | 5.280 | 6.955 | 25.13 | 14.81 | 39.94 | 160,4 | 113.1 | 142.9 | 228.2 | 2.02 |

In the Tables 3 and 4, each line represents the average value obtained for a shed where 10 sows farrowed within the space of 1 week.

The trial took place between January and April, and this factor is taken into account in Tables 3 and 4: the figures on the first line represent the piglets born in January, and the figures on the last line the piglets born in April. The figures on the lines on the same level can thus be directly compared.

The examination of Tables 3 and 4 shows that the daily weight increase of the piglets was slightly improved by the use of flavor (about 2%) both before and after weaning, but this increase is not significant: on the other hand, the use of flavor leads to a reduction in the feed to gain ratio; this decrease virtually reaches the threshold of statistical significance (p=0.055).

However, the drop in the feed to gain ratio is too important to be due only to the appetizing and stimulating effects which can be normally expected from a flavor. The pig-breeder noticed an interesting fact in the course of the trial: those piglets whose mothers had had flavored food wasted much less.

EXAMPLE 3

A trial was carried out in order to confirm our assumption that the piglet is conditioned by the sow; it is, in effect, a repetition of the previous trial. We had only 2 groups of animals: those (both sows and piglets) which were given flavored food, and those which did not receive any flavor at all. This test took place on a large-scale pig-farm in the Canton of Geneva (Switzerland) between March and July.

The specific conditions were the following:

- the flavor was added to the food, in a powder form, at a level of 50 ppm of flavor.
- the sows were given the flavored food for 3 weeks before farrowing.
- the food was given to piglets from the first week onwards.
- the piglets were weighed at birth, at weaning time (between 26 and 32 days of age), and then at the end of the trial (i.e., on average at 60 days of age).
- the death rate was controlled.
- the food for the piglets contained fishmeal, soya, molasses and cereals, as well as the usual vitamins and minerals.

Characteristics of the food:

| Wende's analysis | | | |
|---|---|---|---|
| crude protein | 18.0% | Digestible energy: | 2950 Kcal/kg |
| crude fat | 3.0% | Ewers' starch | 36.1% |
| crude fibre | 4.5% | lysin | 0.80% |
| ash | 6.5% | methionin + crystin | 0.75% |
| moisture | 12.0% | tryptophan | 0.18% |
| nitrogen free | | calcium | 1.10% |
| extract | 56.0% | phosphorus | 0.90% |
| | 100.0% | | |

RESULTS:

The results are shown in Tables 5 and 6. The piglets were born between March and July.

Table 5
LITTERS RECEIVING FLAVOURS
Average values for groups of 7 - 8 sows farrowing at the same time - 53 sows in total

| number of piglets | | | | average weights (kg) | | | number of days | | | average daily gain (g) | | |
|---|---|---|---|---|---|---|---|---|---|---|---|---|
| total born | died at birth | died | live at weaning | birth | weaning | final | weaning | final | total | up to weaning | from weaning | birth to final weight |
| 73 | — | 6 | 67 | 1.35 | 6.06 | 19.3 | 26.73 | 37.0 | 63.73 | 176.2 | 357.8 | 281.6 |
| 59 | — | 7 | 52 | 1.48 | 7.00 | 17.4 | 30.33 | 30.0 | 60.33 | 181.8 | 380.1 | 280.4 |
| 59 | — | 9 | 50 | 1.36 | 5.70 | 19.0 | 26.00 | 35.0 | 61.00 | 166.8 | 380.0 | 289.1 |
| 88 | — | 23 | 65 | 1.48 | 6.32 | 15.1 | 31.00 | 28.0 | 59.00 | 156.3 | 313.7 | 231.0 |
| 88 | — | 14 | 74 | 1.48 | 6.09 | 13.3 | 28.00 | 23.88 | 51.88 | 164.4 | 302.4 | 227.9 |
| 75 | 2 | 1 | 72 | 1.43 | 6.66 | 14.6 | 28.00 | 29.78 | 57.78 | 186.9 | 266.4 | 227.8 |
| 88 | 3 | 14 | 71 | 1.39 | 5.82 | 17.3 | 29.82 | 37.00 | 66.82 | 148.3 | 310.2 | 238.0 |
| per litter | | | | | | averages | | per piglet | | | | |
| 10.0 | 0.09 | 1.40 | 8.51 | 1.427 | 6.229 | 16.51 | 28.58 | 31.36 | 59.94 | 168.0 | 327.7 | 251.6 |

Table 6
LITTERS RECEIVING NO FLAVOURS
Average values for groups of 7 - 8 sows farrowing at the same time - 53 sows in total

| number of piglets | | | | average weights (kg) | | | number of days | | | average daily gain (g) | | |
|---|---|---|---|---|---|---|---|---|---|---|---|---|
| total born | died at birth | died | live at weaning | birth | weaning | final | weaning | final | total | up to weaning | from weaning | birth to final weight |
| 72 | — | 11 | 61 | 1.395 | 6.180 | 14.0 | 28.92 | 26.0 | 54.92 | 165.4 | 300.7 | 229.5 |
| 71 | 3 | 16 | 52 | 1.425 | 6.750 | 16.8 | 31.06 | 31.0 | 62.06 | 171.4 | 342.4 | 247.8 |
| 73 | — | 4 | 69 | 1.471 | 7.275 | 19.0 | 30.67 | 31.0 | 61.67 | 189.2 | 377.7 | 284.0 |
| 96 | 8 | 17 | 71 | 1.472 | 6.366 | 17.2 | 29.08 | 31.0 | 60.08 | 158.2 | 349.3 | 261.7 |
| 82 | 2 | 7 | 73 | 1.466 | 6.452 | 14.2 | 28.00 | 32.88 | 60.88 | 178.0 | 235.9 | 209.3 |
| 94 | 8 | 16 | 70 | 1.438 | 5.786 | 13.0 | 32.70 | 22.60 | 55.30 | 132.9 | 319.2 | 209.0 |
| 70 | — | 5 | 65 | 1.385 | 6.255 | 16.4 | 28.00 | 36.58 | 64.58 | 173.9 | 277.2 | 232.4 |
| per litter | | | | | | averages | | per piglet | | | | |
| 10.14 | 0.38 | 1.38 | 8.38 | 1.438 | 6.431 | 15.77 | 29.75 | 30.14 | 59.89 | 167.87 | 309.9 | 239.4 |

In Tables 5 and 6, possible differences between spring and summer litters were taken into account: for this purpose, we can compare each line in Table 5 with the same line in Table 6.

The number of piglets weaned in each litter was slightly higher when the animals received flavored food; however, these differences are not significant.

During the first stage (from birth to weaning) the flavor does not give any improvement, but the effects appear in the second stage (during and after weaning). The average daily weight gain varies according to the month in which the piglet was born; once this effect has been eliminated, the improvement produced through the use of flavored food does not reach the threshold of statistical significance, but nevertheless, it amounts to 5.7%.

Considering the whole test, e.g., from birth to 60 days of age, and although it is not statistically significant, the improvement in the daily weight gain due to the use of flavored food equalled 5.1%. Unfortunately, we could not check in this trial the amount of food consumed (automatic feeding equipment was used); however, the pig-breeder noticed the same fact as in the previous test: those animals which got flavored food were calmer and, above all, wasted less food.

Conclusions

These various trials covered about 2500 piglets and they enabled us to draw the following conclusions:

The cost of flavoring, including the flavor given to the sow, is less than 1% of the value of the food eaten by the piglets up to approximately 8 weeks of age.

The return of investment is 3 to 20 times higher than the cost of flavoring.

The flavors used throughout the experiments described in above Examples 1–3 were commercially available flavor compositions (origin: Firmenich SA, Geneva, Switzerland; Flavor No. 24 and 24/V in powder form: Premix FIRANOR ®).

Flavors No. 24 and 24/V comprise the following ingredients in the proportions indicated as percentage by weight:

| aldehydes | 30 – 50 % | esters | 3 – 7 % |
| alcohols | 25 – 35 % | terpenes | 20 – 30 % |

EXAMPLE 4

At the time of farrowing pairs of pregnant sows were assigned to either a flavored feed (flavored with FIRANOR ® No. 24/V flavor concentrate available from Firmenich SA, Geneva, Switzerland), or the same, but unflavored, feed.

At 6 weeks the sow's piglets were weaned and offered creep feed. The creep feed was of three varieties:

No. 1 — Purina® baby pig feed pelleted with flavor added (FIRANOR® No. 24 flavor concentrate available from Firmenich SA, Geneva, Switzerland);

No. 2 — Purina® baby pig feed without any flavor added;

No. 3 — Nutrina® baby pig feed pelleted, without any feed flavoring added.

Every day, the three types of creep feed were set out for four 30-minute periods in the following type of maze:

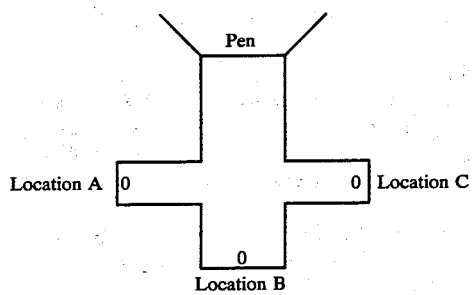

Each creep feed was placed at random in one of the three maze locations (A, B or C), and this disposition was varied each time.

The experiment lasted 21 days, and the following data was collected.

1. Number of visits to each type of creep feed

The total number of visits to each type of creep feed (four visits by one piglet or one visit by four piglets is counted as being the same) was noted each time period. For purposes of statistical analysis, the number of visits per type of creep feed per time period was divided by the number of piglets in the litter to reduce this statistic to a per piglet basis.

2. Time spent (minutes) with each type of creep feed

This was measured at each time period per piglet. The total time each piglet could spend eating any type of creep feed was 30 minutes. Thus any significant change from 10 minutes per creep feed would indicate either a preference or conversely a dislike of any one of the three types of creep feed.

3. Average feed consumption (lbs)

This was calculated per piglet per time period. The present data consists of two sows on the No. 24/V flavoring and two control sows. The final data will be based on four sows on the No. 24/V flavoring and four control sows. The statistical analysis used was an ANOVA model, with the critical level of significance set at $\alpha = 0.05$. The following factors of possible variation were tested for significance:

a. effect of dam-feed flavoring
b. effect of creep feed flavoring
c. interaction of (a) and (b) above
d. effect of time (21 days) on feed consumption, etc.
e. interaction of (a) with (d); (b) with (d); and (a) (b) and (d) above.

RESULTS:

1. No. of visits to each type of creep feed:
The following Table 7 presents the results:

Table 7

Average Number of Visits per Piglet by Type of Creep Feed per Time Period by Type of Dams' Diet

| Dams' Feed | Piglet Feed | | |
|---|---|---|---|
| | No. 1 | No. 2 | No. 3 |
| Flavoured | 2.0 | 2.2 | 2.2 |
| Unflavoured | 1.8 | 1.8 | 1.7 |

There were no statistically significant differences in any of the factors or their interactions tested.

2. Time spent with each creep feed (minutes):
The following Table 8 presents the results:

Table 8

Amount of Time (Minutes) Spent by Each Piglet at Each Type of Creep Feed per Time Period by Type of Dams' Diet

| Dam' Feed | Piglet Feed | | | Total* |
|---|---|---|---|---|
| | No. 1 | No. 2 | No. 3 | Time |
| Flavoured | 21.9 | 4.9 | 3.9 | 30.7 |
| Unflavoured | 10.8 | 13.4 | 5.7 | 29.9 |

*Please note that the total time should be 30.0 minutes per feeding. Any deviation above is due to round-off error as well as observational error.

Statistical analysis indicates that the interaction term (c.) of dams' feed by piglet feed was very highly significant ($p << 0.001$). In particular, it appears that the piglets had a very high preference for the No. 1 flavored creep-feed if their dams received the flavor in their feed.

3. Amount (lbs) of creep-feed consumed per time period per piglet

The following tables and graphs present the results:

Table 9

Amount (lbs) of Each Type of Creep-Feed Consumed by Each Piglet per Time Period* by Type of Dams' Diet

| Dams' Feed | Piglet Feed | | |
|---|---|---|---|
| | No. 1 | No. 2 | No. 3 |
| Flavoured | 0.31 | 0.05 | 0.02 |
| Unflavoured | 0.13 | 0.14 | 0.14 |

*Multiply by four to obtain daily average consumption.

The interaction term (a) × (b) dam-feed by creep-feed was significant ($p < 0.025$). It is apparent that the piglets show a high preference for the combination of flavored creep-feed and flavored sow-feed. The interaction term (a) × (b) × (d) time on trial (days) with dam-feed and creep-feed was very highly significant ($p < 0.001$). This is illustrated in FIG. 1 showing the increase in consumption of the flavored-flavored combination at the expense of the flavored dam-feed-unflavored creep-feed or flavored dam-feed-unflavored No. 3 creep-feed. The three creep-feeds that were offered to piglets whose dams got the unflavored sow-feed showed no difference in their consumption patterns.

FIG. 1 - Average* (per feeding) Consumption of Creep-Feed (lbs.) per Piglet of Dams Receiving the No. 24/V FIRANOR ® Flavouring in Their Feed

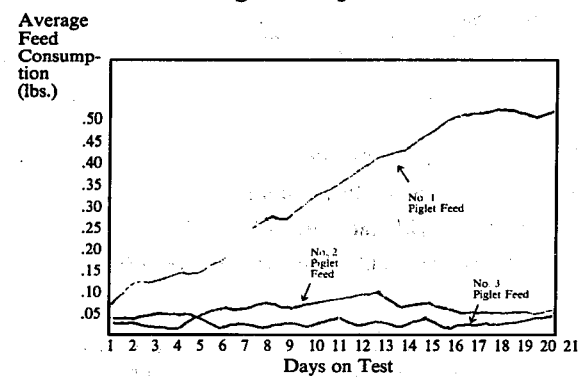

*Multiply by 4 to obtain average daily consumption

EXAMPLE 5

The effects of using flavored feedstuff in the pregnant sow's diet and later on in the sow's baby pigs' diet on their weaning is shown by the following results.

A trial was carried out according to the same procedure as that indicated in Examples 1 to 3. We had two groups of animals: those, both sows and piglets, which were given flavored food (FIRANOR ® No. 24 concentrate), and those which did not receive any flavor at all. The following Table 10 summarizes the results obtained.

Table 10

| | weaning age at 17.6 lbs | age at 44 lbs | duration from 17.6 to 44 lbs | daily growth from 17.6 lbs to 44 lbs lbs/day | % | feed conversion |
|---|---|---|---|---|---|---|
| No flavour | 28 days | 64 days | 36 days | 0.736 | 100 | 2.63 |
| With flavour | 28 days | 59 days | 31 days | 0.852 | 116 | 2.42 |

Test carried out with 254 baby pigs
Feed: pellets ad libitum
(19% protein, 1475 kilo calories productive energy per lb)

I claim:
1. A process for reducing the weaning period of piglets which comprises feeding, for a period of at least one week before parturition, a pregnant sow and subsequently, for the lactation period, a lactating sow with a feedstuff aromatized by means of 0.001 to 0.1% of a flavoring composition, said flavoring composition comprising (a) 30 to 50% by weight of aldehydes; (b) 25 to 35% by weight of alcohols; (c) 3 to 7% by weight of esters; and (d) 20 to 30% by weight of terpenes derivatives; and then feeding the piglets born by the said sow a solid feedstuff aromatized by means of the same type of flavoring composition.

2. A process for increasing the growth rate of piglets during weaning which comprises feeding, for a period of at least 1 week before parturition, a pregnant sow and subsequently, for the lactation period, a lactating sow with a feedstuff aromatized by means of 0.001 to 0.1% of a flavoring composition, said flavoring composition comprising (a) 30 to 50% by weight of aldehydes; (b) 25 to 35% by weight of alcohols; (c) 3 to 7% by weight of esters; and (d) 20 to 30% by weight of terpenes derivatives; and then feeding the piglets born by the said sow a solid feedstuff aromatized by means of the same type of flavoring composition.

* * * * *